Patented June 29, 1948

2,444,176

UNITED STATES PATENT OFFICE 2,444,176

TREATMENT OF CORN STEEPWATER

McCalip J. Thomas and Roy F. Larson, Decatur, Ill., assignors to A. E. Staley Manufacturing Co., Decatur, Ill., a corporation of Delaware No Drawing. Application May 5, 1945, Serial No. 592,293

4 Claims. (Cl. 195—103)

The present invention relates to the treatment of corn steepwater. More specifically it has to do with a process for the preparation of a special nutrient material therefrom for the growth of microorganisms such as, for example, yeasts, molds, and bacteria, having particular reference to the preparation of a nutrient material for the growth of penicillia molds in the production of penicillin.

In the early experimental work on the production of penicillin by culturing the mold, *Penicillium notatum*, it was found that corn steepwater, the production of which is more fully described hereinafter, was an exceptional nutritive material for growing the mold, in that the mold fed with steepwater as the source of nitrogenous material, produced many times the yield of penicillin that it did when any other kind of nutrient was used. Because of this unusual stimulating effect of steepwater, it is now being used by all producers of penicillin as an indispensible ingredient of the nutritive medium used for the mold.

The outstanding utility of steepwater in the production of penicillin has made its use most desirable, but it has several faults which have caused trouble. The concentrated steepwater throws down a heavy sludge which at times becomes almost solid upon standing. This behavior has been a continuous source of difficulty in shipping, storing and pumping the material. It is not feasible to produce a steepwater of lighter density, containing more water, because the less concentrated liquor is subject to a spoilage by fermentation that ruins it as a mold nutrient for penicillin. Another fault is that the steepwater contains undesirable substances which are soluble in the cold, acidic liquor but become insoluble upon raising the pH and upon heating. For example, when the mold growth medium, consisting chiefly of steepwater and a sugar (usually lactose) is sterilized by heating in an autoclave under steam pressure to kill any contaminating organisms before inoculating with the Penicillium spores, an insoluble precipitate is thrown down that is very objectionable. It coats over surfaces such as glass bottles used in the surface-culture method and is difficult to scrub off afterward. Furthermore, as the mold grows, the pH of the medium rises and insoluble phytates (phytic acid is inositol hexaphosphoric acid) and phosphates deposit along with other materials which interfere in the subsequent operations involved in extracting penicillin from the broth.

Steepwater is produced when corn starch is manufactured by what is known as a wet-milling process. The first step in this process is to steep the maize kernels in a dilute solution of sulfurous acid at from 120° to 130° F. for a period of time ranging from 40 to 48 hours. The chief purpose of the steep is to soften the corn so as to insure a smooth milling operation resulting in a clean separation of the starch from germs, bran, and protein. The steeping operation is a fundamental part of the starch manufacturing process and the conditions cannot be varied greatly without causing serious trouble throughout the process.

During steeping, the maize kernels gradually swell and soluble materials therein pass into the steepwater. The sulfurous acid present serves a dual purpose, that is, it prevents the growth of putrefactive microorganisms, and it has a specific loosening effect upon the glutenous material that binds the starch granules together. However, the sulfurous acid does not inhibit all bacterial action. A certain type of lacto-bacillus actively ferments soluble sugars converting them to lactic acid throughout the entire steeping process. The lactic acid produced, which may range from 10 per cent to 20 per cent of the dissolved substances in the steepwater, has a pronounced softening effect on the kernels and is a distinct aid to the subsequent milling operations.

Corn may be steeped batchwise or in a counter-current system, or a combination of the two. The sulfurous acid in the steep is made up to the desired strength of around 0.2 per cent by passing sulfur dioxide gas into the make-up water, after which no more is added. The pH of the steepwater is low (below 4) at the start because of the sulfurous acid. Much of the latter disappears within a few hours. Meanwhile lactic acid fermentation begins and the generation of this acid keeps the pH around 4. As the solubles increase in the steepwater the density rises and at the end is from 3° to 7° Baumé, depending upon the steeping system used. The "light" steepwater is then sent to evaporators and concentrated to a density of from 25° to 30° Baumé. The bulk of it has been mixed, in the past, with the corn gluten and bran as an important ingredient in corn gluten stock feed. Occasional quantities of the "heavy" concentrated steepwater have been sold to yeast growers as a nutritive material.

Steepwater contains an extremely complex mixture of substances consisting of proteins, polypeptides of all sizes, amino acids, reducing sugars, carbohydrates, lactic acid, phytin, inorganic anions and cations, "B" complex vitamins, organic acids and amines and undoubtedly many other substances that have not been detected. Concentrated steepwater of 30° Baumé density contains about 52 per cent dry substance. It is a brown, viscous liquid which upon standing forms a semi-solid to almost solid sludge. The insoluble material that precipitates out consists in part of insoluble or denatured proteins, magnesium and calcium lactates and calcium and magnesium phytates.

It would seem that steepwater contains a substance, or substances, which exert a specific effect upon the mold which causes it to produce more penicillin than it otherwise would in a normal growth process on usual nitrogenous-carbohydrate media; or there may be a combination and balance of growth factors in steepwater, such as vitamins, certain amino acids, carbohydrates and salts which might provide the apparent stimulus. On the other hand, steepwater also contains much extraneous material that is either of no benefit or injurious to the penicillin-producing ability of the mold, and interferes with the recovery of penicillin from the broth culture.

An object of the invention is the production of a special nutrient material from corn steepwater which is free of unrequired and objectionable solids.

Another object of the invention is the production of a special nutrient of particular advantage in the production of penicillin which does not throw down an objectionable precipitate during the growth of the mold.

Another object of the invention is the production from corn steepwater of a clean nutrient material in which the desirable constituents are concentrated, and from which inert or objectionable substances have been eliminated.

Another object of the invention is the production of a clean nutrient material which, when used as the mold growth media for producing penicillin, results in higher extracted yields of penicillin because of the freedom from troublesome impurities.

Another object of the invention is to produce from corn steepwater a nutrient material having enhanced biological activity in the culture of penicillia mold strains for the production of penicillin.

Another object of the invention is to produce from corn steepwater a nutrient material having enhanced biological activity in the culturing of microorganisms in general, especially the yeasts, molds, and bacteria.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the application of which will be indicated in the claims.

Briefly, the invention contemplates treating corn steepwater with a suitable alkali to raise the pH of the liquor so as to precipitate out the phytin and other insoluble materials, without at the same time injuring its nutritive value, followed by filtering, acidifying the filtrate to around the original pH of 4 and reconcentrating. The invention is based on the unexpected discovery that the kind of alkali to be used for the phytin precipitation is a controlling factor. A precise control of all operating conditions is important when using certain alkaline precipitating agents to secure the most desirable results.

A preferred embodiment of the invention comprises mixing crude steepwater with potassium hydroxide to precipitate phytin, for example, in a pH range of from 5.8 to 6.5 at a temperature of from 70° to 140° F. The precipitated material is filtered off, preferably immediately, the filtrate is acidified successively with nitric and hydrochloric acids to a pH within the range of about 3.7 to about 4.5, preferably 4.2, and concentrated in vacuo to a density of around 30° Baumé. The concentrated liquor is then cooled in a crystallizing tank in order to permit magnesium lactate and other insoluble material to crystallize out. The liquor is then filtered from the solids and is ready to use. Accurate control, or balancing of operating conditions, is not required to remove undesirable constituents merely, but also to prevent removal or destruction of desirable substances.

It should be noted that following the alkali precipitation step, the first filtrate provides the special nutrient solution for Penicillium mold inoculation for the production of penicillin if desired for immediate use, and that the subsequent steps of acidifying, concentration and crystallization are largely for the purpose of stabilization and to prevent spoilage in transit and in storage.

The necessary adjustment of the variables of the process, in order to produce a special nutrient of high potency, will appear upon consideration of the individual variables involved as more fully illustrated hereinafter.

*Kind of alkali.*—Potassium hydroxide, for example, is a preferred alkali because it always produces a reliable result. Sodium, lithium and magnesium hydroxides are also satisfactory. Alkaline reacting salts such as carbonates can also be used but they are not as desirable as the hydroxides. Other alkaline reacting salts, such as the sulfites and sulfides, can also be used providing most of the acid anion associated with the metal is subsequently removed from the nutrient material by acidification and distillation or aeration. The oxides of lithium, sodium, magnesium and potassium, as well as the free metals themselves, excepting magnesium, can be used, if desired. They can be considered equivalent to the hydroxides.

*Concentration of the steepwater.*—The density of the steepwater used in the alkali treatment is not necessarily a critical variable and can be varied widely according to convenience. We prefer to concentrate the light steepwater to about 13° to 15° Baumé for the phytin precipitation with potassium hydroxide. More concentrated steepwater decreases the subsequent filtration rates.

*Temperature of treatment.*—This is an important variable which is also related to the pH of precipitation. We prefer to use a temperature below 140° F. and not below normal room temperature, say 70° F. Above 140° F. the liquor tends to discolor badly at the higher pH range of the phytin precipitation with a gradual loss of biological activity. It is not essential that the steepwater be cooled below normal temperatures. We prefer to carry out the treatment at about 120° F. Any variation from this preferred point must be compensated for by changing the pH of precipitation.

*pH range of precipitation.*—The pH to which the steepwater is brought by the addition of alkali, in conjunction with the temperature, is a very important variable requiring precise control. At the preferred temperature of 120° to 130° F. the pH should be raised to 5.9 to 6.1. At ordinary temperatures, say from 70° to 80° F., the pH should be raised to 6.4 to 6.5 range. At 140° F. a pH of about 5.8 is best. The desired relationship between temperature and pH within the optimum ranges of these variables is expressed by the equation $$pH = 7.2 - (\text{temperature} \div 100) \pm 0.1$$

Although optimum results are obtained by operating within the temperature range of 70–140° F., and adjusting the pH to the temperature as indicated above, the qualities of corn steepwater as a nutrient for penicillin production are improved by adjusting its pH to a value anywhere within the range of 5.0 to 7.5, even at room temperature of 70° F., and filtering off the precipitated solids.

*Amount of alkali.*—The control is based on pH and not on the quantity of alkali used to reach the desired pH. Steep liquor varies from time to time in composition, particularly in lactic acid content, and varying quantities of alkali are used on different batches.

*Kind of acid for acidification.*—After removal of the precipitated material, the filtrate is acidified with a suitable inorganic acid, preferably with nitric and hydrochloric acids. The purpose of the nitric acid is to provide the nutrient with nitrate ion which is needed by the mold to produce the highest yields of penicillin. Since the amount of nitrate required is less than the total amount of acid required to drop the pH to the desired level, the remainder of the acidification is accomplished with hydrochloric acid. From a practical standpoint, the hydrochloric acid alone can also be used, or a calculated amount of nitric acid and sulfuric acid. Complete acidification with sulfuric acid is not desirable.

*pH of acidification.*—The purpose of reacidifying the filtrate is primarily to protect the nutrient against spoilage by microorganisms. At above about 5 pH, even the concentrated nutrient may deteriorate rapidly in storage and become valueless for penicillin product. We prefer a pH in the range of 3.7 to 4.5 and specifically 4.2.

*Concentration of nutrient.*—After acidification to about pH 4.2, the filtrate is concentrated in vacuo to a Baumé of from 30 to 32. The temperature should be kept as low as possible during the evaporation and preferably should not exceed 160° F. While it is possible to concentrate to as high as 35° Baumé the liquor becomes too hard to handle conveniently in the final filtration.

*Final crystallization.*—The heavy liquor of 30° to 32° Baumé is sent to a crystallizer and cooled with constant agitation in order to facilitate the crystallization of lactate salts and other materials. The time required for the crystallization is from 24 to 48 hours at a temperature of around 70° F. The removal of lactic acid as a salt improves the nutrient.

The process, controlled as indicated above, when operating upon steepwater direct from the steeps produces a special nutrient of particular advantage for the production of penicillin, especially for the surface-culture method. If the steepwater is subjected to a further fermentation, under conditions that obtained in the steeps, until the reducing sugars are substantially all converted to lactic acid by the action of the lacto-bacillus organisms present, and then employed as starting material for the process, a special nutrient of particular merit in the submerged culture method for producing penicillin is obtained.

An unexpected feature of the special nutrient produced in accordance with the principles of the invention as outlined above is that it gives a much higher yield of penicillin when the culture medium contains phenylacetic acid, a penicillin yield-stimulating substance used in the bottle method, than that which can be obtained with ordinary steepwater.

The operation of the process can be illustrated by the following example:

18,400 lbs. of 14 Baumé liquor from the concentration of light steepwater, at a temperature of 130° F. was placed in a tank equipped with an agitator and the liquor was thoroughly stirred. 75 lbs. of "Hyflo" filter aid was added and 572 lbs. of potassium hydroxide in a 50° Baumé solution was slowly pumped in. This was the amount of alkali required with this particular liquor to attain a pH of 5.9. After complete mixing, the warm slurry was sent to a filter press and the solids filtered off. About 550 lbs. of dry substance solids was removed at this point.

The filtered liquor was collected in another tank for acidification. With thorough agitation, 225 lbs. of 42° Baumé nitric acid was added, and then 336 lbs. of 20° Baumé hydrochloric acid added to bring the pH to 4.2. The acidified liquor was then concentrated in vacuum to 30° Baumé density and sent to a crystallizing tank equipped with cooling coils. The liquor was cooled to about 70° F. as rapidly as possible and allowed to crystallize with slot agitation for 24 hours. At the end of this time, it was filtered in a filter press and yielded about 6,000 lbs. of finished special nutrient. About 300 lbs. of dry substance solids was removed in the final filtration.

Attention again is directed to the fact that the starting steepwater raw material varies in composition from batch to batch and hence the quantities of reagents used will vary with each run. The one exception is nitric acid, the amount of which is fixed as a constant, based on the weight of first filtrate at a given density to be acidified. The controls to be rigidly met are the pH points which are only varied slightly with the temperature. When nitric acid is used, its amount is restricted to that which will provide about 30 grams of nitrate ion per liter of finished product at a density of about 31° Baumé.

The process is not limited to the use of steepwater direct from the steep tanks. In the production of penicillin by the submerged growth process, some manufacturers find that a completely fermented steepwater is advantageous. By completely fermented is meant the conversion of all the reducing sugars in the steepwater to lactic acid by the action of the lacto-bacillus organism. This extra fermentation usually should be carried out in a separate step since the ordinary steeping period is not sufficient. The invention process works equally well using a completely fermented steepwater as the raw material. Because of the larger quantity of lactic acid in the latter, slightly more reagent chemicals are used and the polish filtration cake is heavier.

All liquor densities mentioned hereinbefore are based on a liquor temperature of 60° F.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. In the treatment of corn steepwater for the preparation therefrom of a nutrient material for penicillin production, the steps which comprise maintaining said steepwater at a temperature lying within the range of about 70° F. to about 140° F. while adjusting said steepwater to a pH lying within the range of about 6.5 to about 5.8, the relationship between pH and temperature being expressed by the equation pH=7.2−(temperature÷100)±0.1, said pH adjustment being accomplished by mixing with said steepwater a material selected from the group consisting of the oxides, hydroxides and carbonates of lithium, sodium, potassium and magnesium, whereby undesirable solids are precipitated from said steepwater, and separating remaining liquor from said solids.

2. In the treatment of corn steepwater for the preparation therefrom of a nutrient material for penicillin production, the steps which comprise maintaining said steepwater at a temperature lying within the range of about 70° F. to about 140° F. while adjusting said steepwater to a pH lying within the range of about 6.5 to about 5.8, the relationship between pH and temperature being expressed by the equation pH=7.2−(temperature÷100)±0.1, said pH adjustment being accomplished by mixing with said steepwater a material selected from the group consisting of the oxides, hydroxides and carbonates of lithium, sodium, potassium and magnesium, whereby undesirable solids are precipitated from said steepwater, and acidifying said remaining liquor to a pH lying within the range of about 4.5 to about 3.7 with an inorganic acid.

3. In the treatment of corn steepwater for the preparation therefrom of a nutrient material for penicillin production, the steps which comprise maintaining said steepwater at a temperature lying within the range of about 70° F. to about 140° F. while adjusting said steepwater to a pH lying within the range of about 6.5 to about 5.8, the relationship between pH and temperature being expressed by the equation pH=7.2−(temperature÷100)±0.1, said pH adjustment being accomplished by mixing with said steepwater a material selected from the group consisting of the oxides, hydroxides and carbonates of lithium, sodium, potassium and magnesium, whereby undesirable solids are precipitated from said steepwater, and acidifying said remaining liquor to a pH lying within the range of about 4.5 to 3.7 with a mixture of nitric and hydrochloric acids containing such a proportion of nitric acid that when the acidified liquor is concentrated to a density of about 31° Bé. it will contain about 30 grams of nitrate ion per liter.

4. The process of preparing a nutrient material from corn steepwater for penicillin production which comprises maintaining said steepwater at a temperature lying within the range of about 70° F. to about 140° F. while adjusting said steepwater to a pH lying within the range of about 6.5 to about 5.8, the relationship between pH and temperature being expressed by the equation pH=7.2−(temperature÷100)±0.1, said pH adjustment being accomplished by mixing with said steepwater a material selected from the group consisting of the oxides, hydroxides and carbonates of lithium, sodium, potassium and magnesium, whereby undesirable solids are precipitated from said steepwater, separating remaining liquor from said solids, acidifying said remaining liquor to a pH lying within the range of about 4.5 to about 3.7 with an inorganic acid, concentrating said acidified liquor to a density lying within the range of about 27° Bé. to about 33° Bé., crystallizing solids from said concentrated liquor, and separating remaining liquid nutrient material from said solids.

McCALIP J. THOMAS.
ROY F. LARSON.

REFERENCES CITED

The following references are of record in the file of this patent:

UNITED STATES PATENTS

| Number | Name | Date |
|---|---|---|
| 914,379 | Behr | Mar. 9, 1909 |
| 2,179,203 | Stein | Nov. 7, 1939 |
| 2,305,940 | Walsh | Dec. 22, 1942 |

OTHER REFERENCES

Wells et al.: Ind. and Eng. Chem., Dec. 1939.

Moyer and Heatley: An Improved Method for the Production of Penicillin.

Coghill Monthly Progress Report No. 3, May 2, 1942; ibid., Report No. 13, June 26, 1943.